(12) United States Patent
Krishnakumar et al.

(10) Patent No.: US 11,822,737 B2
(45) Date of Patent: Nov. 21, 2023

(54) INFORMATION HANDLING SYSTEM MOUSE WITH HAPTIC SCROLL

(71) Applicant: Dell Products L.P., Round Rock, TX (US)

(72) Inventors: Karthikeyan Krishnakumar, Austin, TX (US); Suet Chan Law, Singapore (SG); Wong Hin Loong Justin, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/726,679

(22) Filed: Apr. 22, 2022

(65) Prior Publication Data
US 2023/0341954 A1    Oct. 26, 2023

(51) Int. Cl.
*G06F 3/0362*    (2013.01)
*G06F 3/0354*    (2013.01)
*G06F 3/01*    (2006.01)

(52) U.S. Cl.
CPC .......... *G06F 3/0362* (2013.01); *G06F 3/016* (2013.01); *G06F 3/03543* (2013.01)

(58) Field of Classification Search
CPC ..... G06F 3/0362; G06F 3/016; G06F 3/03543
See application file for complete search history.

(56) References Cited

U.S. PATENT DOCUMENTS

| 6,154,201 | A | * | 11/2000 | Levin | G06F 3/0482 345/184 |
| 6,697,827 | B1 | * | 2/2004 | D'Agosto, III | G06F 3/0362 708/131 |
| 7,532,200 | B2 | | 5/2009 | Chu | |
| 9,989,945 | B2 | | 6/2018 | Adler | |
| 2002/0084986 | A1 | * | 7/2002 | Armstrong | G06F 3/03543 345/163 |
| 2002/0101404 | A1 | * | 8/2002 | Tichy | G06F 1/1616 345/157 |
| 2003/0025673 | A1 | * | 2/2003 | Ledbetter | G06F 3/03543 345/163 |
| 2004/0041787 | A1 | * | 3/2004 | Graves | G06F 3/0338 345/157 |
| 2005/0259070 | A1 | * | 11/2005 | Hull | G06F 3/0221 345/156 |

(Continued)

OTHER PUBLICATIONS

Playstation, "DualSense Wireless Controller," downloaded from https://www.playstation.com/en-us/accessories/dualsense-wireless-controller/ on Dec. 8, 2022, 9 pages.

(Continued)

*Primary Examiner* — Ariel A Balaoing
(74) *Attorney, Agent, or Firm* — ZAGORIN CAVE LLP; Robert W. Holland (57) ABSTRACT

An information handling system mouse couples a scroll wheel at a scroll wheel position of the mouse upper surface to a five-way switch so that movement of the scroll wheel commands through the five-way switch a scroll up or down, a swipe left or right and a press down mouse click. An adjacent button provides precision or fast scroll through an interaction separate from the scroll wheel. A vibration device interfaced with the scroll wheel provides haptic feedback of end user interactions, such as by providing vibrations with a vertical orientation from a position below the scroll wheel.

18 Claims, 11 Drawing Sheets

(56) References Cited

U.S. PATENT DOCUMENTS

| | | | |
|---|---|---|---|
| 2005/0259077 A1* | 11/2005 | Adams | G06F 3/0362 |
| | | | 345/163 |
| 2006/0007151 A1* | 1/2006 | Ram | G06F 3/0395 |
| | | | 345/163 |
| 2006/0033703 A1* | 2/2006 | Olien | G06F 3/0362 |
| | | | 345/156 |
| 2009/0231271 A1* | 9/2009 | Heubel | G06F 3/016 |
| | | | 345/173 |
| 2010/0214219 A1* | 8/2010 | Cheng | G06F 3/03543 |
| | | | 345/163 |
| 2011/0157052 A1* | 6/2011 | Lee | G06F 1/1626 |
| | | | 345/173 |
| 2011/0270358 A1* | 11/2011 | Davis | G06F 3/016 |
| | | | 715/846 |
| 2013/0306395 A1* | 11/2013 | Frazier | G05G 5/03 |
| | | | 180/333 |
| 2017/0285848 A1* | 10/2017 | Rosenberg | G06F 3/04883 |
| 2020/0310611 A1* | 10/2020 | Vincent | G09G 5/393 |
| 2021/0038334 A1 | 2/2021 | Hsu et al. | |

OTHER PUBLICATIONS

Logitech, "MX Master 3S," downloaded from https://www.logitech.com/en-us/products/mice/mx-master-3s.910-006556.html on Dec. 8, 2022, 11 pages.

Asus, "ROG Chakram X," downloaded from https://rog.asus.com/mice-mouse-pads/mice/ergonomic-right-handed/rog-chakram-x-model/ on Dec. 8, 2022, 14 pages.

* cited by examiner

INFORMATION HANDLING SYSTEM MOUSE WITH HAPTIC SCROLL

BACKGROUND OF THE INVENTION

Field of the Invention

The present invention relates in general to the field of information handling system peripheral devices, and more particularly to an information handling system mouse with haptic scroll.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components that execute instructions to process information and typically present the information as visual image content at a display, such as an integrated display in a portable system or a peripheral display in portable and desktop systems. Generally, end users interact with the visual image content through peripheral devices, such as a keyboard or a mouse. The mouse has become a ubiquitous tool because it provides an intuitive interface with visual content. A mouse typically includes a position sensor, such as an optical sensor, that reports changes of position to an information handling system, which applies the changes in position by moving a cursor on the display. The mouse typically has buttons to "click" as inputs based upon the cursor position, such as for selecting information associated with an image at the cursor or grabbing part of the image to move to another part of the display. In addition, a mouse typically includes a scroll wheel exposed at an upper surface and accessible to an end user finger when the end user hand rests on the mouse. The scroll wheel generally has a circular shape and rotates in response to a push by an end user finger. As the scroll wheel rotates, a scroll command is sent to the information handling system to move the visual image content up or down based upon the direction of the scroll wheel rotation.

One difficulty with the scroll wheel is that it typically moves visual image content at a set rate, such as to allow an end user to read a web page by scrolling through the content. When an end user wants to scroll at a more rapid rate, the scroll wheel generally must be rotated aggressively to obtain sufficient speed. Typically, the finger position on the upper surface of the mouse makes repeated rotations of the scroll wheel difficult to accomplish. Some scroll wheels include a switch that allows an end user to adjust the amount of scroll that is accomplished for each rotation, such as by changing selection of gears within the mouse. These scroll wheels tend to be inconvenient to operate and require the end user to change the setting manually when changes to scroll rate are desired. Further the various gear assemblies tend to be complex, which makes them more expensive to manufacture and more likely to break. The scroll wheel position is typically read by an optical sensor within the mouse, which is subject to noise and can be less precise.

SUMMARY OF THE INVENTION

Therefore, a need has arisen for a system and method which provides a robust and flexible scroll wheel interface.

In accordance with the present invention, a system and method are provided which substantially reduce the disadvantages and problems associated with previous methods and systems for including a scroll wheel interface at a mouse upper surface. A multi-directional switch disposed in a mouse and coupled to a scroll wheel member extending above an upper surface of the mouse accepts scroll inputs that translate into scroll commands by multi-directional switch actuations. A haptic feedback is provided in response to scroll commands by a vibration device coupled to the scroll wheel member. A precision scroll button offers user preference scroll responses independent of the scroll wheel, such as changes of a scroll rate associated with multi-function switch actuations.

More specifically, an information handling system processes information with a processor and memory that cooperate to execute instructions and present the information as visual image content at a display. A mouse with an optical position sensor in a mouse body reports movement to control a cursor presented at the display. A scroll wheel exposed at an upper side of the mouse body accepts presses by an end user to move the display visual content with a scroll up or down. The scroll wheel has a scroll member, such as a semicircular scroll wheel, that couples to a multi-directional switch disposed in the mouse body, such as a five-way switch that actuates with a forward way, rearward way, left way, right way and a downward push way. End user pushes on the scroll wheel forward and rearward command a scroll up and scroll down. End user pushes on the scroll wheel left and right command a swipe left and right. A push down on the scroll wheel can be configured by end user preferences to command a mouse click, a fast scroll or other events. In one embodiment, a precision scroll button is disposed proximate the scroll wheel to command various scroll responses, such as an incremental scroll movement, a page scroll or a fast scroll. A vibration device coupled to the scroll wheel provides a haptic response to actuation of the switch that commands a scroll event.

The present invention provides a number of important technical advantages. One example of an important technical advantage is that a scroll wheel has a robust and flexible response to provide end user scroll inputs at a mouse. The five-way switch offers precision scroll inputs measured by switch actuations and confirmed with adjustable haptic feedback for a user configurable scroll input and response. The scroll command is accomplished with a slight finger press and offers a ready fast-scroll option with a finger press and hold or by simultaneous actuation of multiple switch inputs. The scroll input has less finger travel than a conventional scroll wheel and wears the multi-directional switch less while also having a smaller footprint and reliable hardware. The scroll command results from a digital and binary event that is more precise and operates with less noise for precise and repeatable usage patterns.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system mouse exposes a haptic scroll wheel member at an upper surface that translates end user presses to a five-way switch to command scroll, swipe and mouse click inputs. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
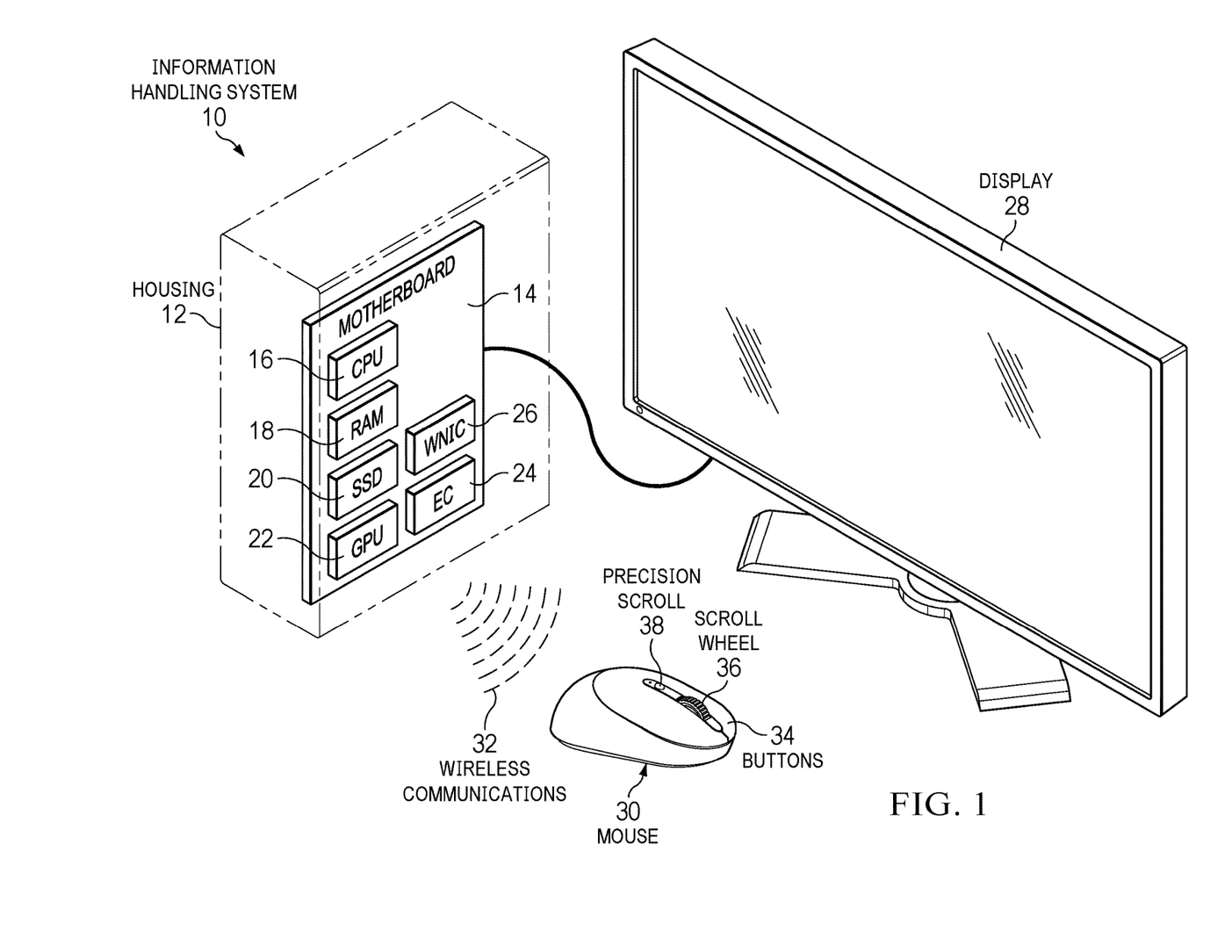
FIG. 1 depicts a block diagram of an information handling system interfaced with a mouse having a haptic scroll wheel and precision scroll button.

Referring now to FIG. 1, a block diagram depicts an information handling system 10 interfaced with a mouse 30 having a haptic scroll wheel 36 and precision scroll button 38. Information handling system 10 has processing components disposed in a housing 12 couple to a motherboard 14 that cooperate to process information. In the example embodiment, a central processing unit (CPU) 16 executes instructions to process information in cooperation with a random access memory (RAM) 18 that stores the instructions and information. A solid state drive (SSD) 20 provides persistent storage, such as of an operating system and applications that execute on CPU 16 to support end user interactions with peripheral devices. A graphics processing unit (GPU) 22 further processes the information to define visual images for presentation at a display 28. An embedded controller 24 manages operations of the processing components at a physical level, such as application of power and interactions with peripheral input devices like a keyboard and mouse. A wireless network interface controller (WNIC) 26 supports wireless communications 32 with external devices, such as a WiFi network and Bluetooth peripheral devices.

During execution of an operating system and applications, information handling system 10 presents a user interface at display 28 that an end user interacts with using a mouse 30. For example, mouse 30 includes a position sensor that tracks movement of the mouse on a desktop surface and translates the movement to a cursor presented on display 28 in cooperation with the operating system. For instance, the movements are reported by a wireless communication signal 32 to WNIC 26 and through embedded controller 24 to CPU 16. Buttons 34 at a front side of mouse 30 accept end user inputs known as mouse clicks that typically include a right, center and left button associated respectively with left, center and right mouse clicks. In addition, a scroll wheel 30 exposed at a scroll wheel position in the upper surface of mouse 30 accepts scroll inputs that move the visual contents presented at display 28 up and down based upon a forward or rearward rotation movement at scroll wheel 36. In a conventional scroll wheel, a wheel rotates next to a sensor in the mouse that reports the rotation to information handling system 10. Instead, the improved scroll wheel 36 described herein has a semicircular shape exposed at mouse 30 upper surface that accepts end user presses forward and backwards and translates the end user presses to an internal five-way switch to command scroll up and down, as is set forth in greater detail below. In addition, a separate precision scroll button 38 accepts precision scroll commands that move visual content in a user prescribed manner, such as precise increments or page up and down increments. In one example embodiment, precision scroll button 38 serves as a mode switch between single and three-line scroll modes commanded by a press and release that is translated to a tactile switch within mouse 30. The single line scroll offers a fine tuned movement for the scroll response as compared to a slightly faster movement for the scroll response in the three-line mode.

Figure 2:
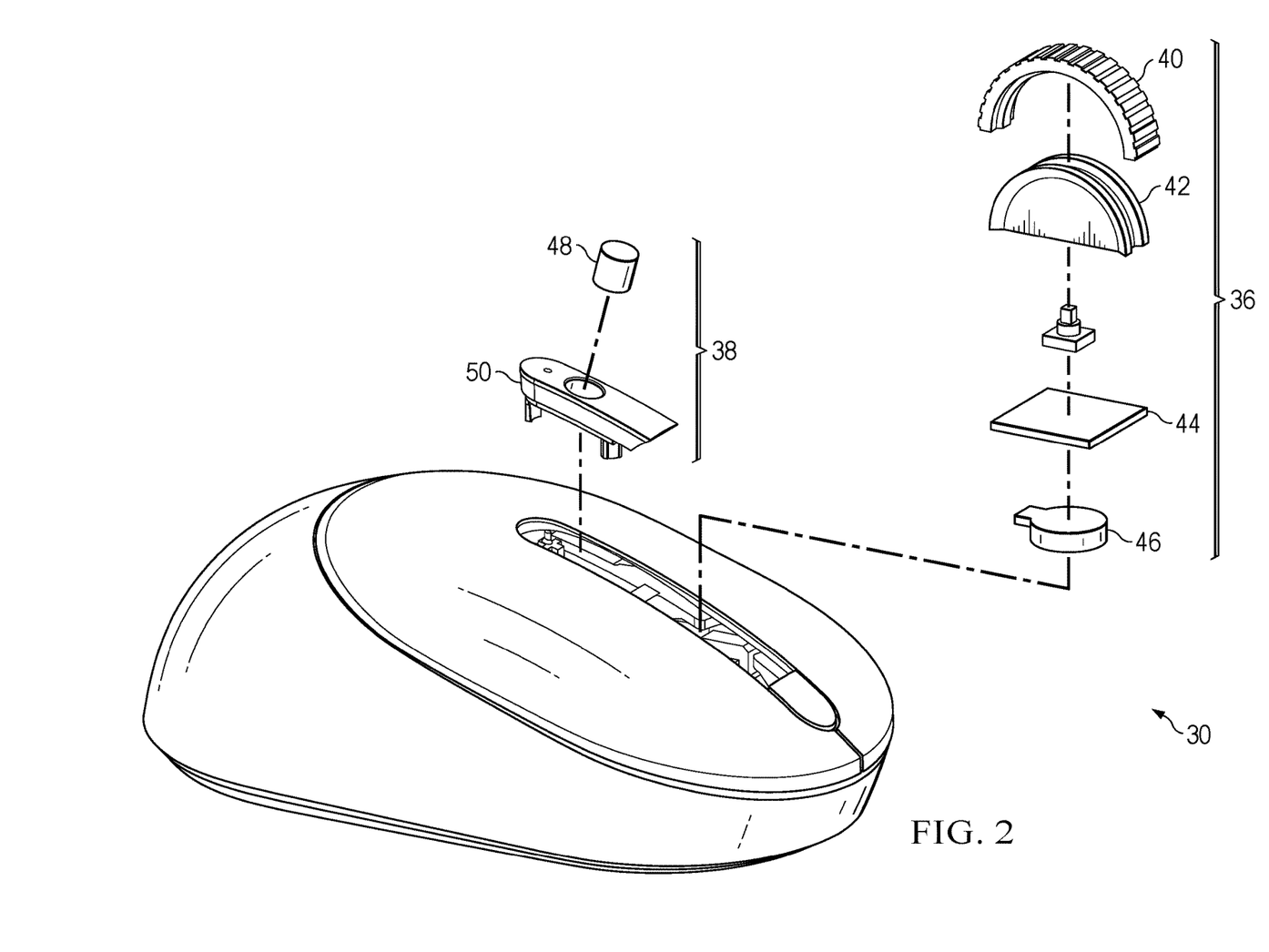
FIG. 2 depicts a side perspective exploded view of the mouse with interaction of the scroll wheel and a five-position switch to command scrolls, swipes and mouse clicks.

Referring now to FIG. 2, a side perspective exploded view of mouse 30 depicts the interaction of scroll wheel 36 and a five-way switch 44 to command scrolls, swipes and mouse clicks. In the example embodiment, scroll wheel 36 has a semicircular shaped member 42 covered by a wheel surface 40 that mimics a conventional rotating scroll wheel. Semicircular member 42 couples over five-way switch 44 to translate end user forces to the five-way switch as inputs. A vibration device 46 couples to five-way switch 44 and semicircular member 42 to provide haptic feedback when inputs are detected by five-way switch 44. For instance, to command a scroll up an end user pushes forward on semicircular member 42 to actuate the front way of five-way switch 44 resulting in a scroll up command sent to the information handling system and a haptic vibration by vibration device 46. To command a scroll down an end user pushes backwards on semicircular member 42 to actuate the rear way of five-way switch 44 resulting in a scroll down command sent to the information handling system and a haptic vibration by vibration device 46. In one example embodiment, a right or left push on semicircular member 42 actuates right or left ways of five-way switch 44 to command a swipe right or left to the information handling system and a haptic vibration feedback of vibration device 46. For instance, the swipe moves display content sideways, such as to look through a folder of pictures. A press down on semicircular member 42 actuates a press down way of the five-way switch to command a mouse click, which may or may not have a haptic feedback. In one embodiment, right and left mouse clicks may be performed by simultaneously actuating the down push way with the right side or left side way, while a down push way actuation alone indicates a center mouse button click. In another embodiment, a fast scroll up or down is commanded by simultaneously pressing the down way while also actuating the forward way or rearward way. In various other embodiments, functions provided by the multi-direction switch may be programmable by an end user, such as to command other types of changes at a display of presented visual images.

In the example embodiment, a precision scroll button 38 is placed to a rear side of the scroll wheel to command scroll in a more precise manner. For instance, each press of precision scroll button 38 changes a scroll mode of scroll wheel 36 between a single line and three-line scroll response to allow an end user to select a fine-tuned scroll response or a more rapid scroll response. In alternative embodiments, other types of scroll mode response may be selected, such as a change between a small increment scroll response and a page increment scroll response at each button press. Precision scroll button 38 is a press down button 48 held in place by an island bracket 50 coupled to the upper surface of mouse 30. The function performed in response to a press down may be defined by end user preferences managed at an information handling system. When no preference is selected, mouse 30 may simply communicate a scroll increment as if the scroll wheel received an input.

Figure 3:
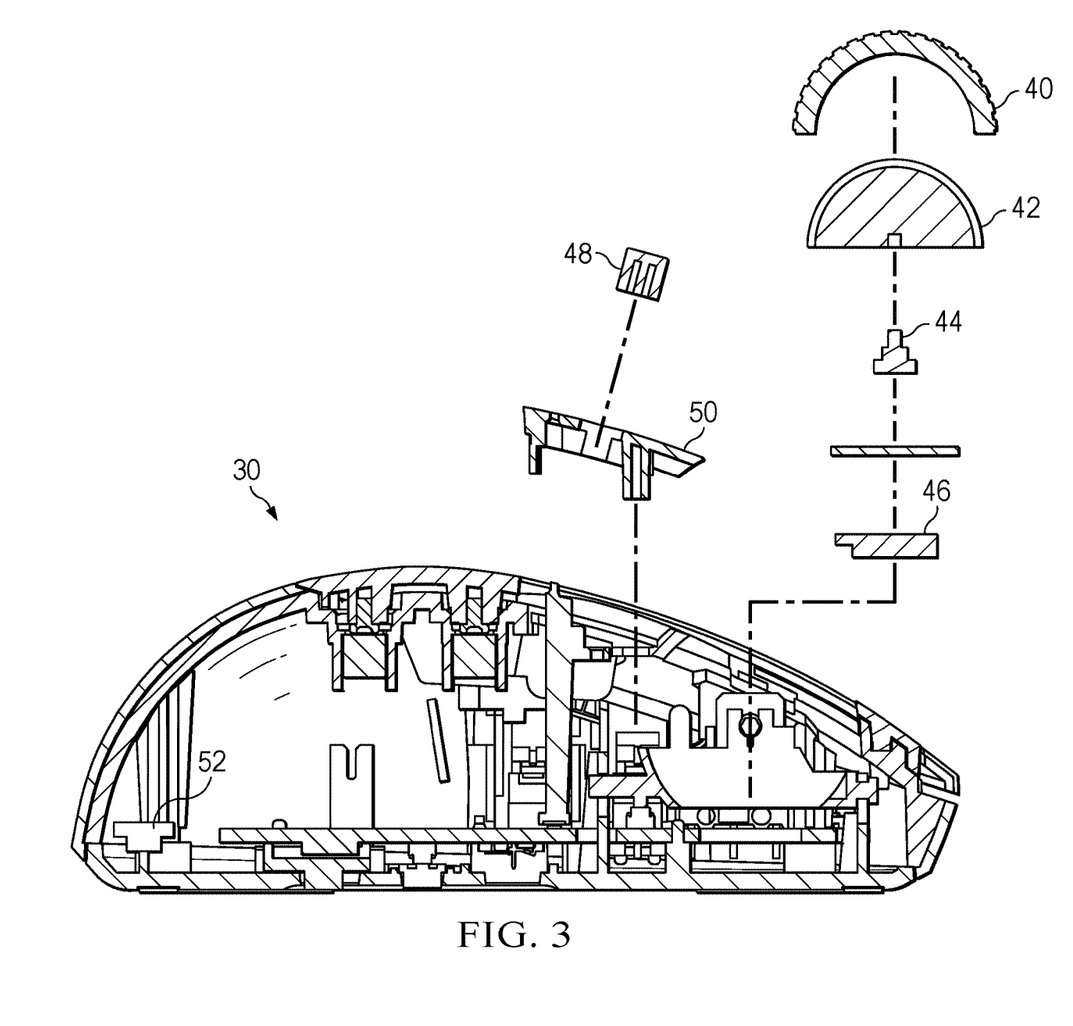
FIG. 3 depicts a cross-sectional exploded view of the mouse assembly of the scroll wheel and precision scroll button into a mouse body.
Figure 6:
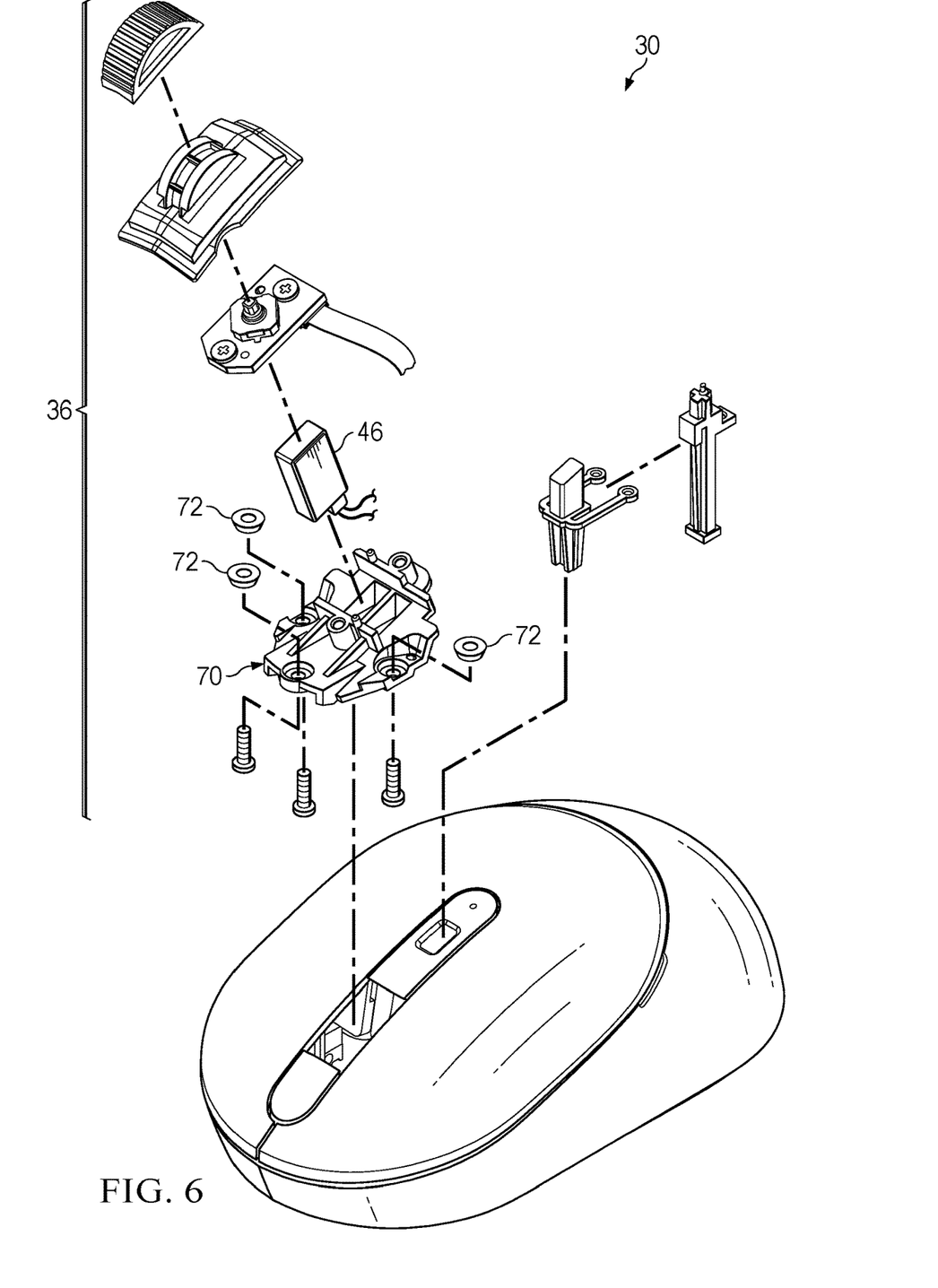
FIGS. 6, 6A, 6B and 6C depict rubber washers to assemble the scroll wheel to a mouse body so that vibrations are dampened at the mouse body and more isolated at the scroll wheel.
Figure 6A:
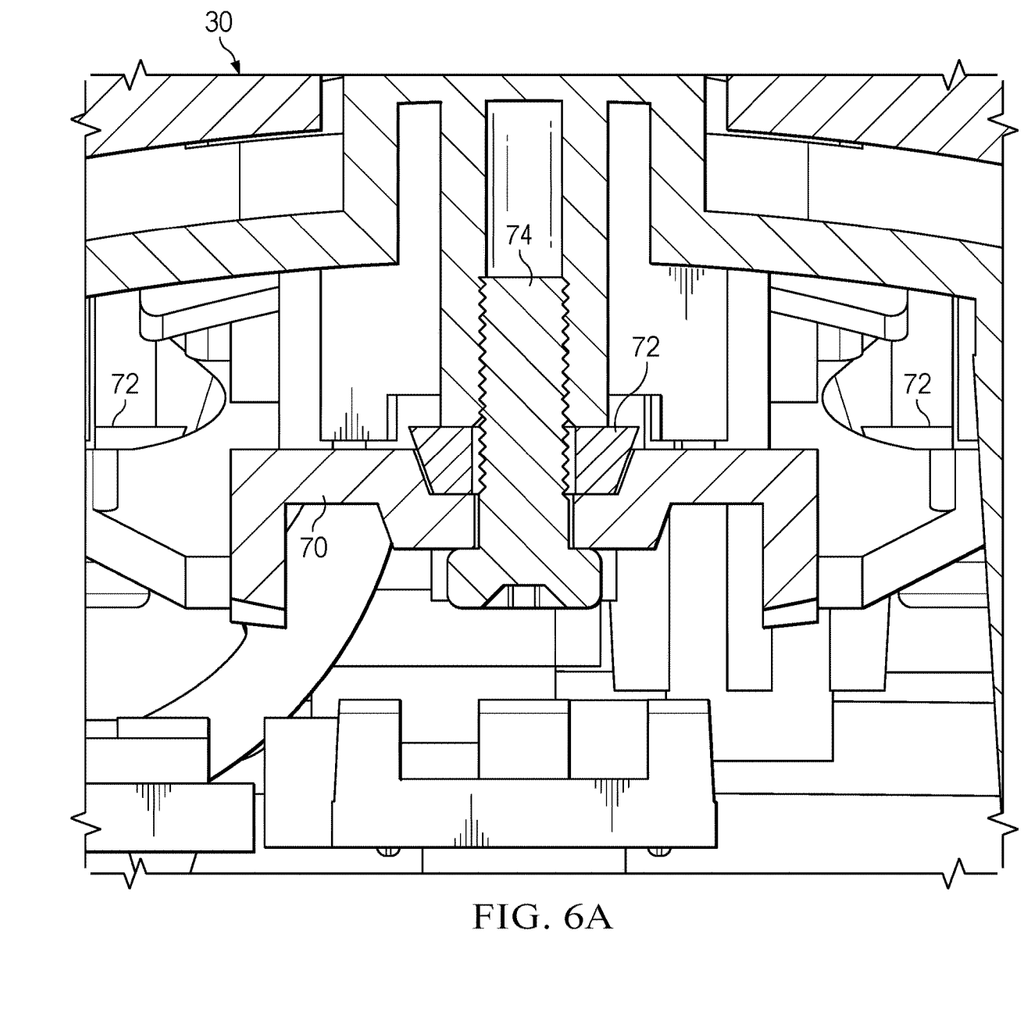
Figure 6B:
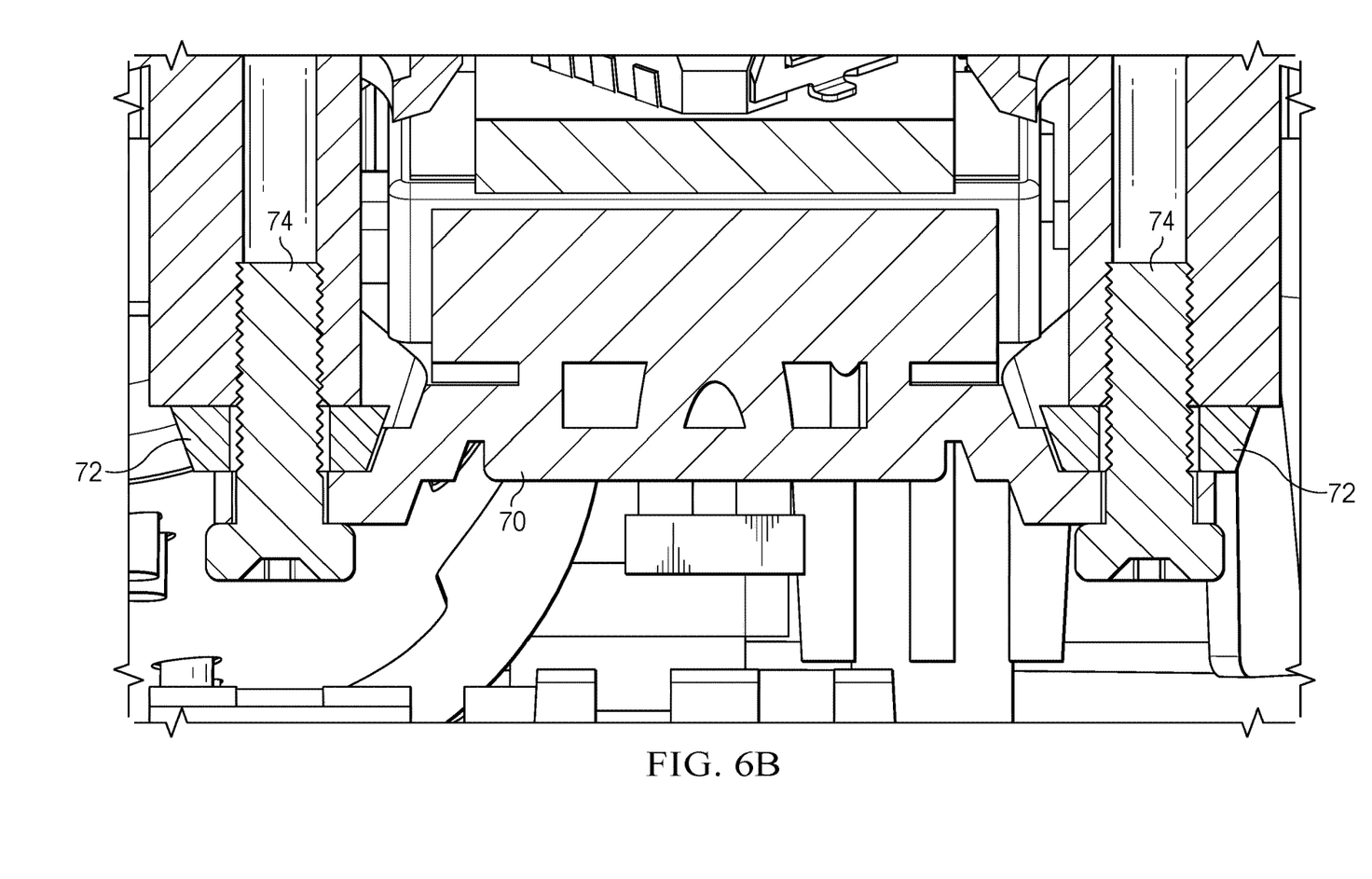

Referring now to FIG. 3, a cross-sectional exploded view of mouse 30 depicts assembly of the scroll wheel and precision scroll button into a mouse body 52. In the example embodiment, semicircular member 42 extends out of mouse body 52 as if a full circular rotating wheel is in use. Wheel surface 40 provides a feel of a full scroll wheel to the end user although the actual movement felt by the end user may be only that needed to translate an input from semicircular member 42 to five-way switch 44, which extends into an opening at the bottom side of semicircular member 42. Vibration device 46 disposed within a cavity of mouse body 52 generates a haptic effect that provides feedback to the end user of a completed input. Precision scroll button 38 fits into an opening of island bracket 50 and presses down to input a precision scroll command at a tactile button, which may also receive some haptic feedback by vibration device 46. In alternative embodiments, the scroll wheel may use a full circular form that rotates to translate inputs to the five-way switch. In one alternative embodiment, the wheel surface may slide around a non-rotating circular shape to provide movement feedback to an end user of an input. In the example embodiments of FIGS. 2 and 3, vibration device 46 is a coin shaped device that has a lateral orientation. In an alternative embodiment shown in greater detail in FIG. 6, a vertical orientation of the vibration is used. One potential benefit of the vertical versus horizontal application of vibration is that the vibration tends to translate to the semicircular member with less translation to mouse body 52. Various orientations may be used for the vibration device based on the type of device used and the direction of vibration energy from the device. For instance, off balance rotating wheels and piezoelectric devices may have different vibration profiles so that a vibration device orientation can be used that will best translate vibration to the scroll wheel instead of the mouse body.

Figure 4:
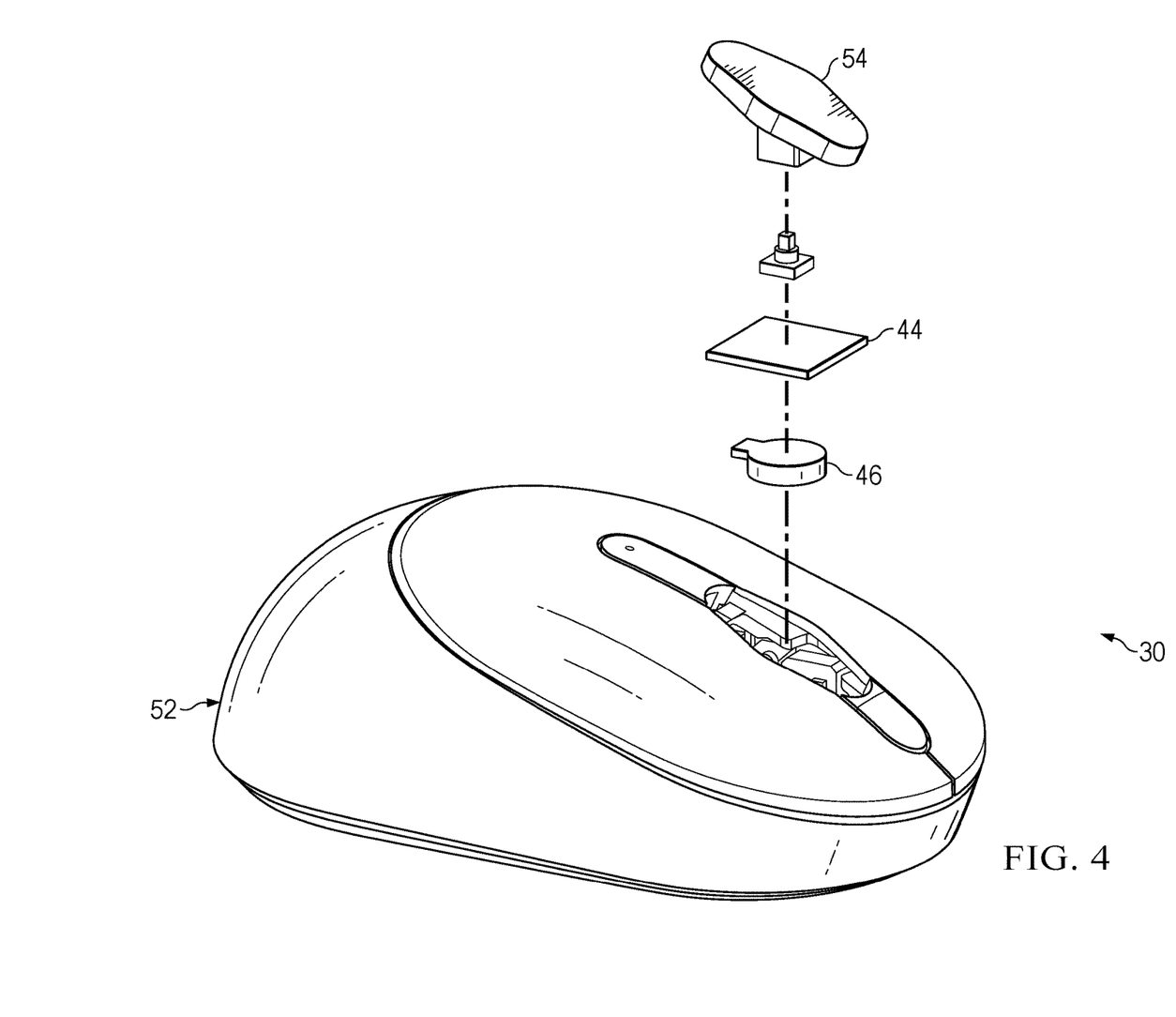
FIG. 4 depicts a side perspective exploded view depicts the mouse with an alternative embodiment of the scroll wheel having a planar haptic input button.

Referring now to FIG. 4, a side perspective exploded view of mouse 30 depicts an alternative embodiment of the scroll wheel having a planar haptic input button 54. Planar haptic input button 54 floats relative to mouse body 52 to accept end user presses in the five ways of actuation supported by five-way switch 44. Vibration device 46 provides haptic feedback through the planar button when an input is made. In alternative embodiments, other shapes may be used for the scroll wheel to help enhance the end user interactions, such as a slight arc to the upper surface or a more identifiable input location, such as joystick shape.

Figure 5:
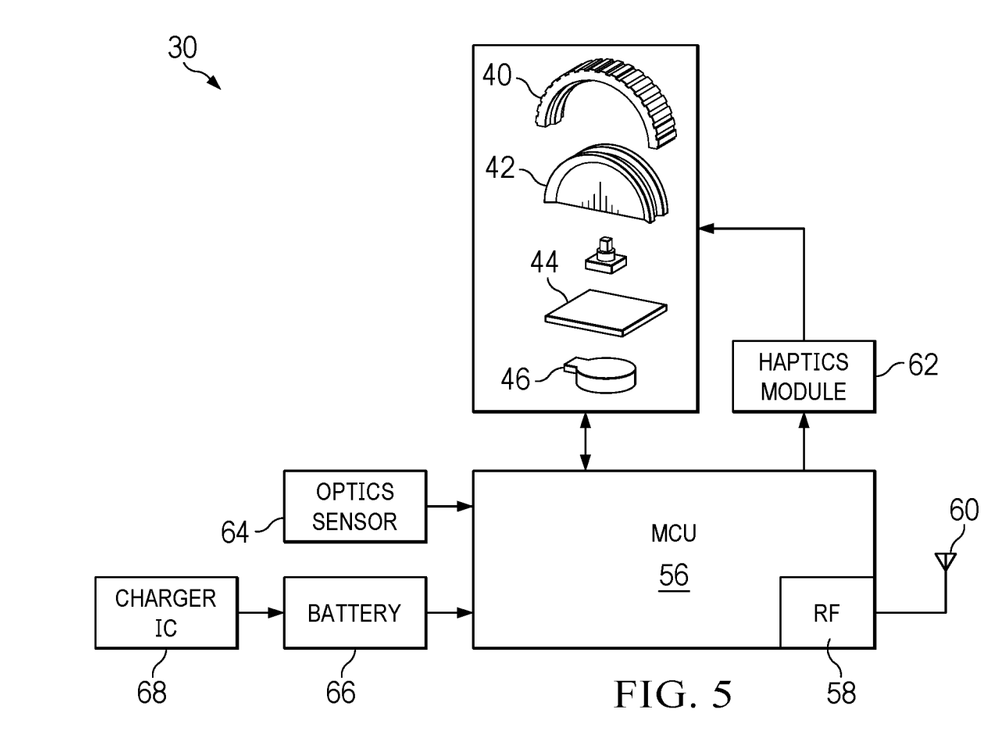
FIG. 5 depicts a block diagram of mouse logical elements to support a haptic scroll wheel.

Referring now to FIG. 5, a block diagram depicts mouse logical elements to support a haptic scroll wheel. In the example embodiment, mouse 30 receives end user scroll wheel inputs by presses at wheel surface 40 to move semicircular member 42, which translates to actuation of five-way switch 44. Five-way switch 44 communicates actuations to an MCU 56 or similar processing resource to communicate the input to an information handling system through wireless signals of a radio 58 and antenna 60, such as with Bluetooth signals. When five-way switch actuations are detected, MCU 56 selectively activates a haptics module 62 to command vibration by vibration device 46. Mouse 30 detects changes in the mouse position on a desktop surface with an optical sensor 64 or similar sensor. A battery 66 provides charge to power mouse 30 with a charge of battery 66 managed by a charger integrated circuit 68. Although the example embodiment uses a five-way switch 44, alternative embodiments may use a variety of multi-directional switches that accept inputs at different directions similar to a joystick. In one embodiment, a two way switch is used to support scroll up and down. In another embodiment, a three way switch supports scroll up and down with forward and rearward actuation and fast scroll when a downward push is included with a forward or rearward push. In one embodiment, MCU 56 communicates to an information handling system the inputs detected at five-way switch for interpretation at the information handling system. Alternatively, MCU 56 may be programmed by an information handling system based upon end user preferences to provide user-preferred responses to inputs.

Figure 6C:
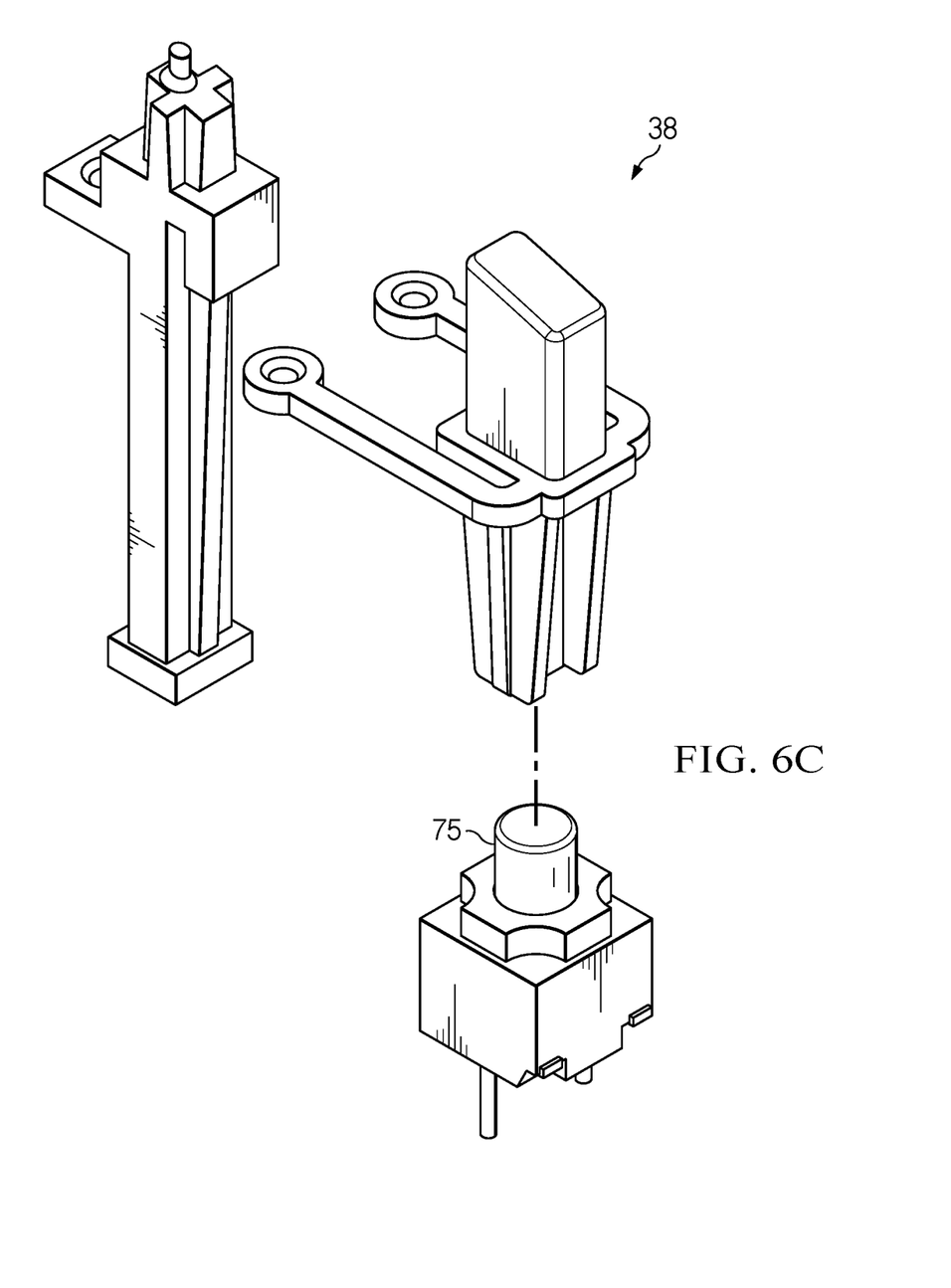

Referring now to FIGS. 6, 6A, 6B and 6C, rubber washers 72 are depicted to assemble the scroll wheel 36 to a mouse body so that vibrations are dampened at the mouse body and more isolated at the scroll wheel. In the example embodiment, a mounting plate 70 couples scroll wheel 36 to the mouse body as an assembly that includes the vibration device 46 and rubber washers 72 at screw openings. Screws 74 pass through the openings and couple against rubber washers 72 so that vibration generated by vibration device 46 within the scroll wheel assembly is isolated at the scroll wheel assembly and dampened from the mouse body. In the example embodiment, vibration device 46 has a vertical orientation relative to the mouse body and provides an up and down vibration movement that translates to scroll wheel 36 more efficiently that to the mouse body. Mounting plate 70 with rubber washers 72 helps to isolate the vertically oriented vibrations to the scroll wheel by dampening translation to the mouse body. Tests have shown that the vertical orientation of vibrations enhances the haptic feedback felt by the end user as compared with vibrations having a horizontal orientation. FIG. 6C depicts and exploded view of precision mouse button 38 with a support member holding a button member aligned over a tactile switch 75 that is pressed to provide an end user input. In one embodiment, an LED on the support member may illuminate as a visual indication of the type of precision mouse input selected, such as by illuminating for fast scroll and off for slow scroll.

Figure 7:
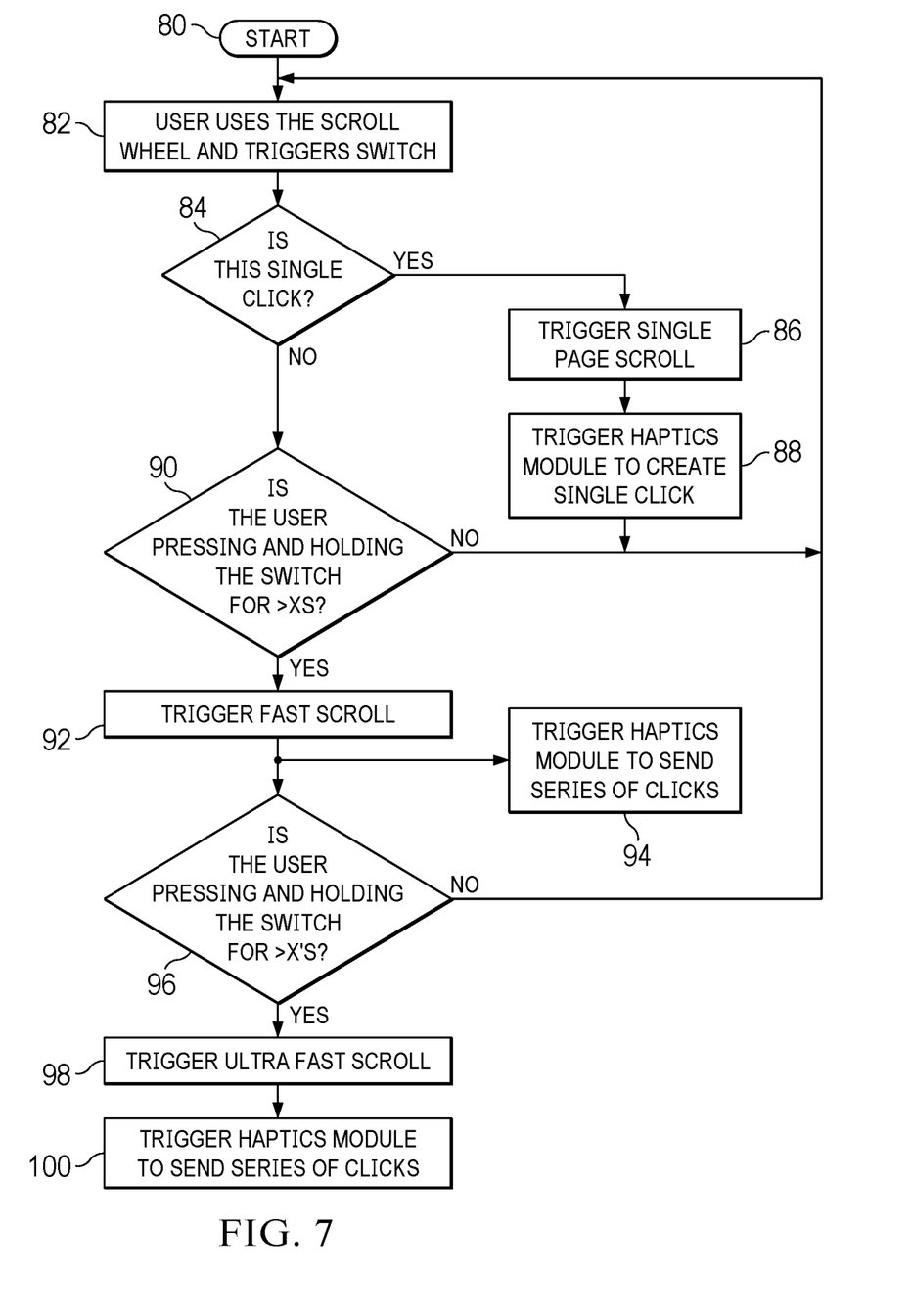
FIGS. 7, 7A, 7B and 7C depict a flow diagram of a process for applying haptic feedback based upon five-way switch inputs and associated haptic feedbacks.
Figure 7A:
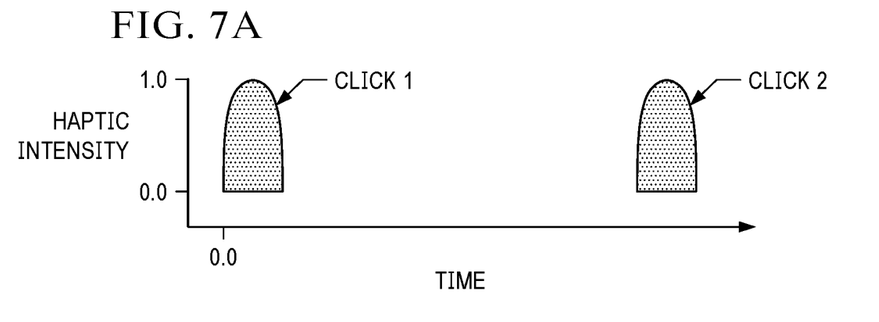
Figure 7B:
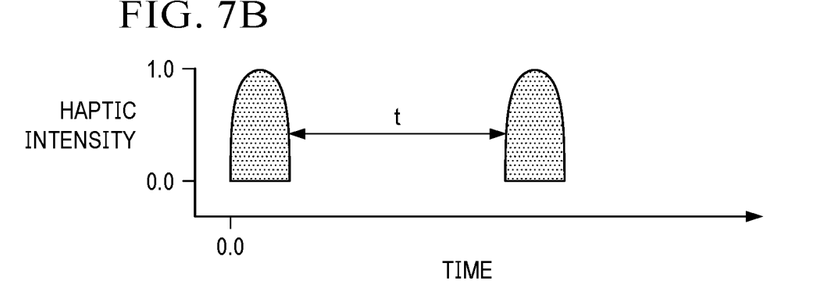
Figure 7C:
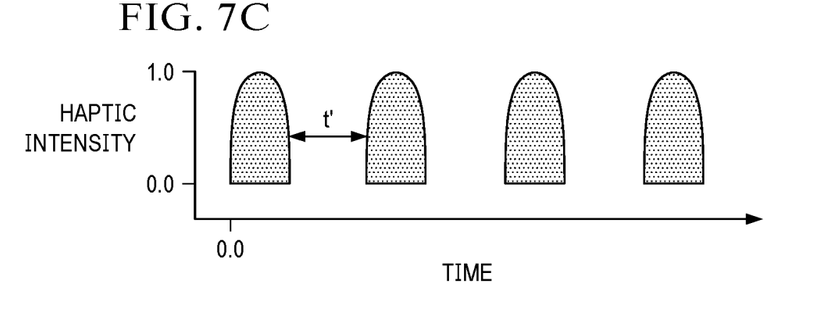

Referring now to FIGS. 7, 7A, 7B and 7C, a flow diagram depicts a process for applying haptic feedback based upon five-way switch inputs and the associated haptic feedbacks. The process starts at step 80 and at step 82 the end user performs an input at the scroll wheel that actuates at least one way of the five-way switch. At step 84 a determination is made of whether the actuation is a single click input with just one way of the five-way switch actuated. If yes, the process continues to step 86 to command the single page scroll associated with the actuation, such as an equivalent to a single rotation movement at a conventional scroll wheel. If the actuation is a side motion, the command may be instead to command a page swipe at display visual images. At step 88 the vibration device is actuated to create a single click of haptic feedback as shown by FIG. 7A and the process returns to step 82. If at step 84 multiple click inputs or multiple actuated ways of the 5-way switch are actuated, the process continues to step 90 to determine the type of input. In the example embodiment, a determination of multiple inputs is made if the scroll wheel input is held greater than a defined time period. If not, the process returns to step 82 to apply a single click input. If yes, the process continues to step 92 to command a fast scroll and step 94 to trigger a haptic response associated with a fast scroll as shown by FIG. 7B holding the haptic feedback for a defined time. At step 92 the process continues to step 96 to determine if the way actuation remains held for another predefined time. If not, the process returns to step 82. If yes, the process initiates an ultra fast scroll and at step 100 the haptic response indicated by FIG. 7C of repeated vibrations for a defined time. Although the process of FIG. 7 provides fast and ultra fast scroll based upon an amount of time that the scroll is commanded, in an alternative embodiment fast scroll may be commanded by simultaneous downward way input press with a forward or rearward press.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute instructions that process information;
a memory interfaced with the processor and operable to store the instructions and information;
a display interfaced with the processor and operable to present the information as visual images; and
a mouse interfaced with the processor and operable to move a cursor presentation location at the display with a position sensor in a body of the mouse when the body moves relative to a surface, the mouse having a non-rotating scroll device exposed at an upper side between first and second input buttons, the non-rotating scroll device having a five-way switch, the five-way switch including at least a first way to scroll the display visual images up and a second way to scroll the display visual images down and coupled to a vibration device that generates vibration in response to inputs at the five-way switch, the vibration device vibration dampened to the body with a rubber washer, the vibration device varying the intensity of vibration based upon at least a rate of scroll commanded through the five-way switch.

2. The information handling system of claim 1 further comprising:
a semicircular scroll wheel coupled to the mouse and the five-way switch;
wherein a rearward push on the semicircular scroll wheel translates to activate the first way and a forward push on the semicircular scroll wheel translates to activate the second way.

3. The information handling system of claim 2 wherein the five-way switch includes a third-way and fourth-way each perpendicular to the first-way and second-way and commanding a swipe of the display visual images.

4. The information handling system of claim 3 wherein the five-way switch includes a fifth-way activated by a downward press into the mouse to command a mouse button input click.

5. The information handling system of claim 3 wherein:
the five-way switch commands a left mouse click when the third-way and fifth-way activate simultaneously; and
the five-way switch commands a right mouse click when the fourth-way and fifth-way activate simultaneously.

6. The information handling system of claim 2 further comprising:
a mounting plate coupling the vibration device and the semicircular scroll wheel as a unit;
wherein the rubber washers couple to the mounting plate and the mouse body to dampen vibration translation towards the mouse.

7. The information handling system of claim 1 further comprising a push button exposed proximate the five-way switch and activated to command a precision scroll of the visual information.

8. The information handling system of claim 7 wherein the haptic device has a vertical orientation.

9. A method for scrolling visual content presented at an information handling system display, the method comprising:
exposing an interface of a five-way switch at a mouse upper surface scroll wheel position instead of a rotating scroll wheel;
commanding a scroll down of the visual content in response to a first-way actuation of the five-way switch;
commanding a scroll up of the visual content in response to a second-way actuation of the five-way switch; and
vibrating the interface with a vibration device in response to the commanding of the scroll up and the commanding of the scroll down, the vibrating isolated to the interface with a rubber coupling of the vibration device and varying in intensity based at least upon a rate of scroll commanded by the five-way switch.

10. The method of claim 9 further comprising:
swiping visual content right in response to a third-way actuation of the five-way switch; and
swiping visual content left in response to a fourth-way actuation of the five-way switch.

11. The method of claim 9 further comprising pressing down on the five-way switch for a fifth-way actuation to command a mouse click.

12. The method of claim 11 further comprising:
commanding a right mouse click when the fifth-way actuation is combined with a third-way actuation to a right side of the five-way switch; and
commanding a left mouse click when the fifth-way actuation is combined with a fourth-way actuation to a left side of the five-way switch.

13. The method of claim 10 further comprising:
exposing a scroll wheel as the interface with the five-way switch; and
vibrating the scroll wheel with a vibration device as haptic feedback for a five-way switch actuation.

14. The method of claim 13 further comprising:
mounting the scroll wheel and vibration device to a bracket; and
isolating vibration at the bracket from the mouse with rubber washers.

15. The method of claim 13 further comprising commanding a precision scroll with a separate button exposed at the mouse upper surface proximate the scroll wheel.

16. A mouse comprising:
a body shaped to accept movement by an end user hand;
first and second input buttons exposed at a front upper side of the body to accept end user presses;
a five-way switch disposed in the body between the first and second input buttons to accept actuations by an end user from five direction;
a scroll wheel having a non-rotating semicircular form exposed at the upper side between the first and second input buttons and coupled to the five-way switch to actuate a first-way of the five way switch to command an up scroll direction of visual information and a second way of the five-way switch to command down scroll direction of the visual information; and
a vibration device coupled to the body with rubber washers and to the scroll wheel to vibrate the scroll wheel as haptic feedback to five-way switch actuation, the vibration isolated from the scroll wheel and varied based at least upon a rate of scroll commanded by the five-way switch.

17. The mouse of claim 16 wherein:
a third-way actuation of the five-way switch commands a right swipe of the visual information; and
a fourth-way actuation of the five-way switch commands a left swipe of the visual information.

18. The mouse of claim 17 wherein a fifth-way actuation of a press down on the five-way switch commands a mouse click.

\* \* \* \* \*